(12) United States Patent
Rahn et al.

(10) Patent No.: US 8,943,952 B2
(45) Date of Patent: Feb. 3, 2015

(54) BREWER INCLUDING SUBSTANCE REMOVAL ASSEMBLY

(75) Inventors: Christopher W. Rahn, Virden, IL (US); James I. Miller, Decatur, IL (US)

(73) Assignee: Bunn-O-Matic Corporation, Springfield, IL (US)

(*) Notice: Subject to any disclaimer, the term of this patent is extended or adjusted under 35 U.S.C. 154(b) by 622 days.

(21) Appl. No.: 12/990,190

(22) PCT Filed: Apr. 30, 2009

(86) PCT No.: PCT/US2009/042359
§ 371 (c)(1),
(2), (4) Date: Jan. 4, 2011

(87) PCT Pub. No.: WO2009/135034
PCT Pub. Date: Nov. 5, 2009

(65) Prior Publication Data
US 2011/0111107 A1    May 12, 2011

Related U.S. Application Data

(60) Provisional application No. 61/049,189, filed on Apr. 30, 2008.

(51) Int. Cl.
| | | |
|---|---|---|
| A47J 31/057 | (2006.01) |
| A47J 31/06 | (2006.01) |
| A47J 31/02 | (2006.01) |
| A47J 31/40 | (2006.01) |
| B65D 43/26 | (2006.01) |
| A01K 43/00 | (2006.01) |
| A23L 1/28 | (2006.01) |

(Continued)

(52) U.S. Cl.
CPC ................................ *A47J 31/368* (2013.01)

USPC ............ 99/300; 99/289 R; 99/295; 99/302 R; 99/307; 99/306; 99/280; 220/264; 426/231; 426/425

(58) Field of Classification Search
USPC ............ 99/300, 289 R, 295, 302 R, 307, 306, 99/280; 426/231, 425
See application file for complete search history.

(56) References Cited

U.S. PATENT DOCUMENTS 2,252,614 A * 8/1941 Bowen ........................ 99/289 R
2,903,359 A * 9/1959 Bonotto ........................ 426/319

(Continued)

FOREIGN PATENT DOCUMENTS

WO    WO 2006/025078    3/2006

OTHER PUBLICATIONS

International Search Report issued in application No. PCT/US09/42359 (2009).

*Primary Examiner* — Dana Ross
*Assistant Examiner* — Gyounghyun Bae
(74) *Attorney, Agent, or Firm* — Barnes & Thornburg LLP

(57) ABSTRACT

A brewer, system, and method of use for producing and dispensing a beverage. The apparatus, system, and method of use includes a receiver for receiving a brewing substance container. The receiver receives the container, positions it for infusion with heated water, and then positions the container for removal from the receiver. The present apparatus, system, and method minimizes the drive mechanisms associated with the apparatus and improves the control and reliability of the apparatus. The apparatus facilitates collection and dispensing of beverage produced in the receiver and removal of the brewing substance container from the receiver.

17 Claims, 13 Drawing Sheets

(51) Int. Cl.
*C12C 3/00* (2006.01)
*A47J 31/36* (2006.01)

(56) References Cited

U.S. PATENT DOCUMENTS

| | | | |
|---|---|---|---|
| 3,086,446 A * | 4/1963 | Totten | 99/283 |
| 3,132,580 A * | 5/1964 | Walker | 99/282 |
| 3,223,023 A * | 12/1965 | Miller | 99/283 |
| 5,025,714 A * | 6/1991 | Brewer | 99/300 |
| 5,393,540 A * | 2/1995 | Bunn et al. | 426/231 |
| 5,404,794 A | 4/1995 | Patel et al. | |
| 6,079,315 A | 6/2000 | Beaulieu et al. | |
| 6,182,554 B1 | 2/2001 | Beaulieu et al. | |
| 6,227,101 B1 * | 5/2001 | Rabadi et al. | 99/280 |
| 6,741,180 B2 * | 5/2004 | Lassota | 340/622 |
| 6,857,352 B2 | 2/2005 | Fischer | |
| 6,857,353 B2 | 2/2005 | Kollep et al. | |
| 7,063,238 B2 | 6/2006 | Hale | |
| 7,131,369 B2 * | 11/2006 | Gantt et al. | 99/289 R |
| 7,210,401 B1 | 5/2007 | Rolfes et | |
| 7,217,908 B2 * | 5/2007 | Orrico et al. | 219/689 |
| 7,316,178 B2 * | 1/2008 | Halliday et al. | 99/295 |
| 2002/0129712 A1 * | 9/2002 | Westbrook et al. | 99/279 |
| 2002/0148356 A1 | 10/2002 | Lazaris et al. | |
| 2003/0129286 A1 * | 7/2003 | Knepler | 426/231 |
| 2003/0159589 A1 * | 8/2003 | Meador | 99/295 |
| 2004/0055473 A1 * | 3/2004 | Stoner | 99/295 |
| 2004/0250686 A1 | 12/2004 | Hale | |
| 2005/0061158 A1 | 3/2005 | Della Pietra et al. | |
| 2006/0037482 A1 | 2/2006 | Maver | |
| 2006/0037483 A1 | 2/2006 | Kief | |
| 2007/0221069 A1 * | 9/2007 | Rahn et al. | 99/323 |
| 2008/0041233 A1 * | 2/2008 | Bunn | 99/281 |
| 2008/0092746 A1 * | 4/2008 | Clark et al. | 99/281 |
| 2008/0095904 A1 * | 4/2008 | Sullivan et al. | 426/431 |
| 2011/0111107 A1 * | 5/2011 | Rahn et al. | 426/425 |

\* cited by examiner

US 8,943,952 B2

BREWER INCLUDING SUBSTANCE REMOVAL ASSEMBLY

CROSS REFERENCE TO RELATED APPLICATIONS

This application is a U.S. nationalization under 35 U.S.C. §371 of International Application No. PCT/US2009/042359, filed Apr. 30, 2009, which claims the benefit of priority under 35 U.S.C. §119(e) to U.S. Provisional Application No. 61/049,189, filed Apr. 30, 2008. The disclosures set forth in the referenced applications are incorporated herein by reference in their entireties, including all information as originally submitted to the United States Patent and Trademark Office.

BACKGROUND

A variety of beverage brewing apparatus have been developed for use in infusing a beverage brewing substance with water to produce a beverage. Examples of beverage brewing substance include coffee, tea, herbs, botanicals, as well as variety of other substances. Traditionally, brewing has been accomplished by dispensing heated water over the beverage brewing substance to infuse the substance retained in a substance holding filter or basket and then draining the brewed beverage from the substance.

A variety of packaged brewing substances have been available for use in an apparatus which infuses the packaged brewing substance. The brewing substance package is often referred to as a "pod" or sachet. A pod brewing apparatus is used to brew using a prepackaged pod often include a brewing chamber which retains the pod. The brewing chamber communicates with a water delivery system which delivers heated water to the chamber for infusing the substance retained in the pod. An exit or drain communicates with the chamber to allow beverage to drain from the chamber.

A variety of manually loaded and cleared pod brewers have been developed. Such brewers include a drawer, holder, or other apparatus which forms part of the brewing chamber. In using one of the pod brewing apparatus, a user places a pod in the drawer. The drawer is engaged with the brewer to close the brewing chamber. A brew cycle is activated whereupon heated water is dispensed into the closed chamber for brewing.

On of the problems that may arise with such a system is that the previous user may not remove their pod from the brewing apparatus. As a result, the pod may be a nuisance to remove, may transfer flavors to the drawer, or if left unattended for a significant period of time, may dry out or otherwise become undesirable. This problem is exacerbated in settings in which the pod brewer is used by a group of people such as in an office coffee dispensing setting.

As such, it would desirable to include a pod brewing apparatus which includes a mechanism for removing the pod from the chamber at the conclusion of a brewing cycle. It would also be desirable to provide a simplified pod brewer which can automatically close the chamber during or in preparation for a brewing cycle and then remove the pod from the chamber at the conclusion of the brewing cycle. It would also be desirable to provide a bin or other container to allow for accumulation of multiple spent pods.

BRIEF DESCRIPTION OF THE DRAWINGS

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

While this disclosure has been described as having an exemplary embodiment, this application is intended to cover any variations, uses, or adaptations using its general principles. It is envisioned that those skilled in the art may devise various modifications and equivalents without departing from the spirit and scope of the disclosure as recited in the following claims. Further, this application is intended to cover such departures from the present disclosure as come within the known or customary practice within the art to which it pertains.

DETAILED DESCRIPTION

Figure 1:
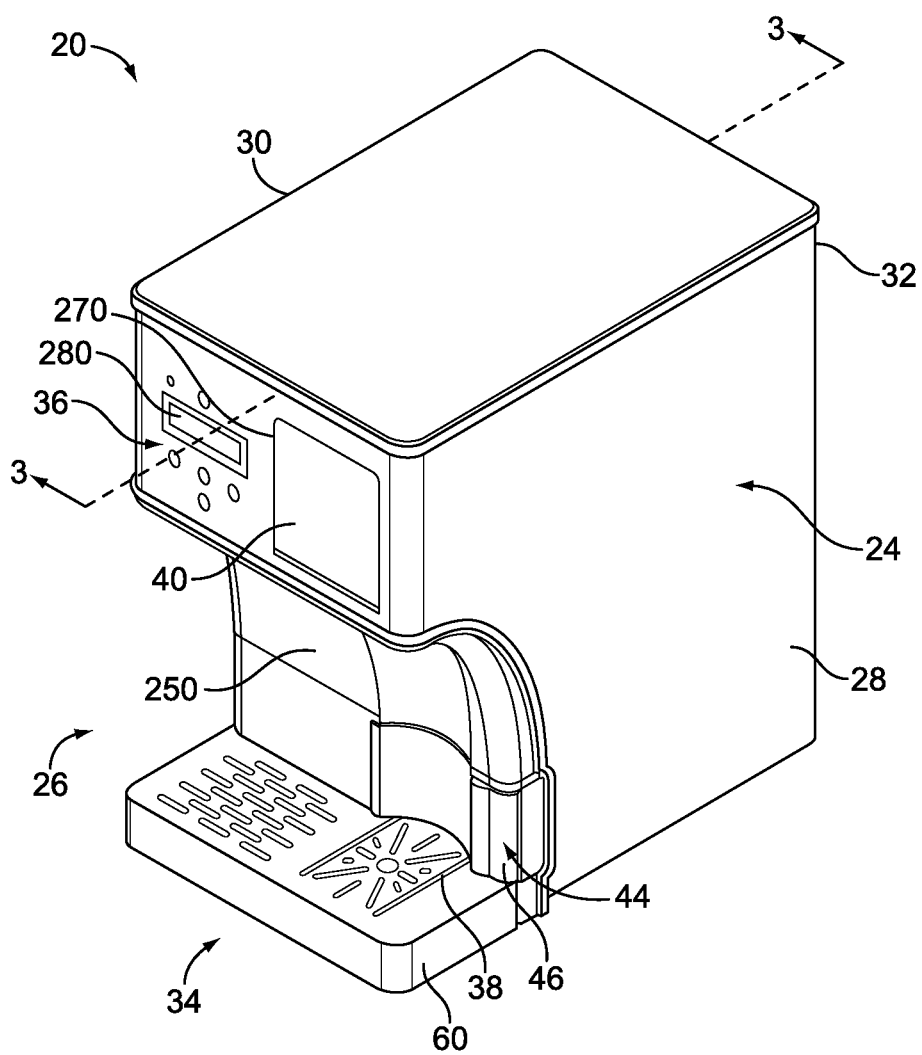
FIG. 1 is a perspective view of a beverage brewing apparatus or brewer of the present disclosure showing a front perspective view of the brewer.

With reference to FIG. 1, a beverage maker or brewer 20 is shown defined by housing 24 having a front 26, sides 28, 30 and a rear 32. The front includes an access area 34. The front also includes a control panel or user interface 36, a dispensing area 38, and an access door 40. The brewer as shown is a type that receives a pod, sachet, capsule, cartridge or other prepackaged beverage making container containing a beverage making substance for mixing with heated water to dispense a beverage.

It should be noted that the present disclosure will refer to a "pod" throughout the remainder of the description. However, it is intended that the term pod is to be broadly interpreted to include any type of prepackaged beverage making container. The teachings of the present disclosure are applicable to prepackaged beverage brewing substance containers as well as loose brewing substance. While pod is generally referred to, any form of pod, sachet, capsule, cartridge, bag or other container which might be used in a brewing system and removed there from at the end of a brewing cycle is incorporated without limitation. All variations that are currently known or subsequently developed for such an application are included.

It should be noted that the present disclosure may refer to a coffee in reference to beverage making substance throughout the remainder of the description in the interest of clarity and simplicity. However, it will be understood that any form of beverage making substance may be used to produce a beverage and the term coffee is intended to be broadly interpreted. This broad interpretation is also intended to include, but is not limited to, beverage substances such as ground coffee, tea, herbs, botanicals, liquid beverage concentrate, ground, pulverized, rough cut, whole, powdered beverage concentrate, flaked, granular, freeze dried or other forms of materials including liquid, gel, crystal or obtain a desired beverage or other food product or any other forms of beverage substance or food products. Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified.

Figure 2:
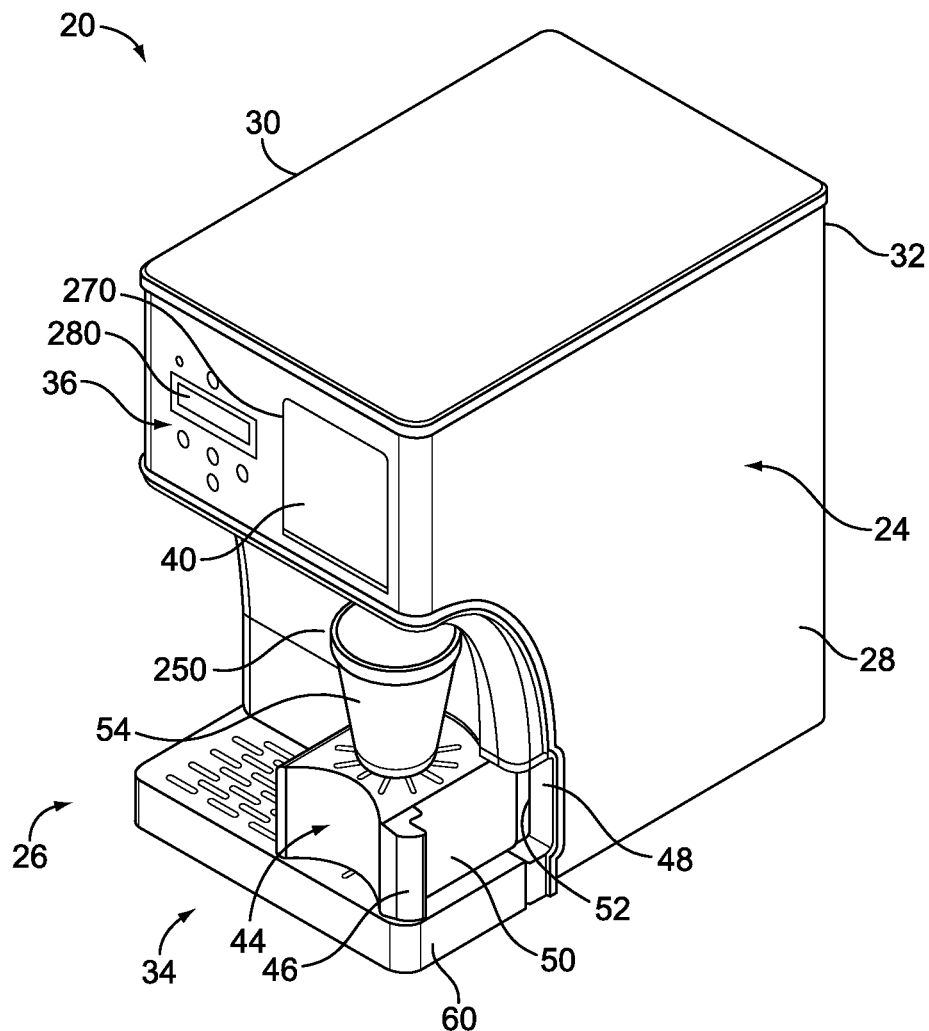
FIG. 2 is a view of brewer as shown in FIG. 1 in which a cup riser has been extended from an opening in the housing of the brewer.

With further reference to FIG. 2, a cup riser 44 is provided. The cup riser includes a handle 46 which is retractable in a recess 48 in the housings. The body portion 50 of the riser is positionable in and extractable from an opening 52 in the housing. The riser provides elevation for a cup 54 which can be placed thereon. Placing the cup on the riser allows the cup to be positioned closer to an outlet 58 (see FIG. 3).

Figure 5:
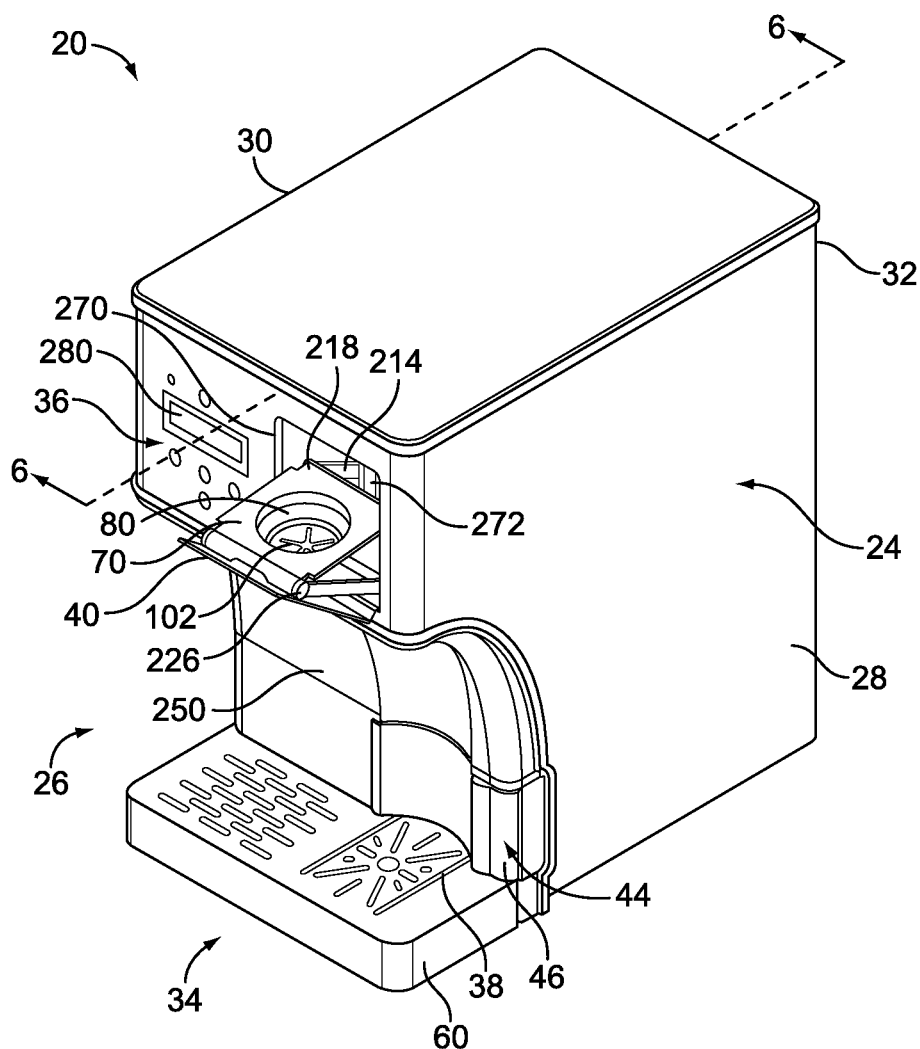
FIG. 5 is a perspective view of the brewer similar to that as shown in FIGS. 1 and 2 and in which an access door on a front face of the brewer has been opened by action of the pod receiver for receipt of a pod in a cavity in the pod receiver.

With reference to FIG. 5, a cross-sectional view is shown as taken along line 3-3 in FIG. 1. In this view, the riser 44 is retracted into the opening 52. A removable drip tray 60 is provided in a lower portion of the housing 24.

Figure 3:
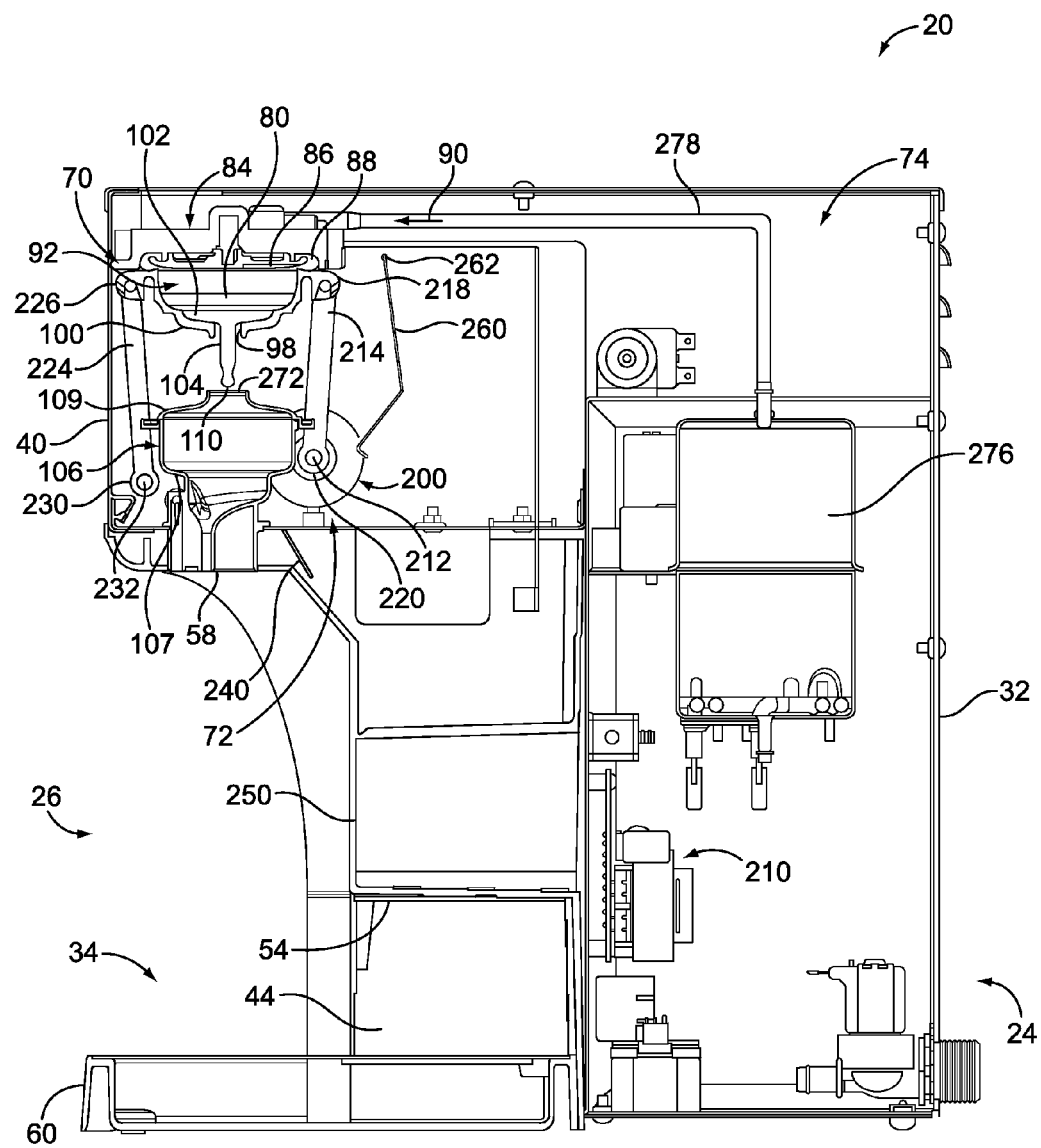
FIG. 3 is an enlarged cross-sectional view of the brewer as shown in FIG. 1, the cross-section being taken along lines 3-3 in FIG. 1 showing a pod receiver positioned relative to a water delivery head of a water delivery system and a drive assembly coupled to the pod receiver for displacing the pod receiver through a path of travel for receiving the pod, infusing the pod and mechanically displacing the pod from the pod receiver.

Behind the access door 40 is a pod receiver 70 which is coupled to a drive assembly 72 and a water delivery system 74. In use, a pod 76 (see FIG. 8) is positioned in a cavity 80 of the pod receiver 70. In the brewing position as shown in FIG. 3, the pod receiver 70 is positioned proximate to a fixed position water delivery head or spray head 84 which is part of the water delivery system 74. A face 86 of the pod receiver 70 is engaged by an expandable seal 88 carried on the water delivery head 84. As such, water 90 delivered from the water delivery system 74 flows through the head 84 to infuse the pod retained in the cavity 80 of the pod receiver 70.

Water entering the chamber 92 defined by the cavity 80 and the space related to the head 84. Water in the chamber 92 during a brewing cycle helps to expand the seal 88 and provide a relatively tight seal between the head 84 and the pod receiver 70. Water that infuses the pod 76 results in the beverage which drains through a drain hole 98 in a bottom portion 100 of the pod receiver 70. A foraminous bottom or base 102 is positioned between the pod and the drain hole 98 to allow beverage to accumulate in the bottom portion 100 of the receiver 70. A laminating structure or laminator 104 extends through the drain 98 to help direct the flow downwardly through the drain 98 to the mouth 272 of a collection chamber 106 and out the corresponding dispensing passage 58.

Figure 4:
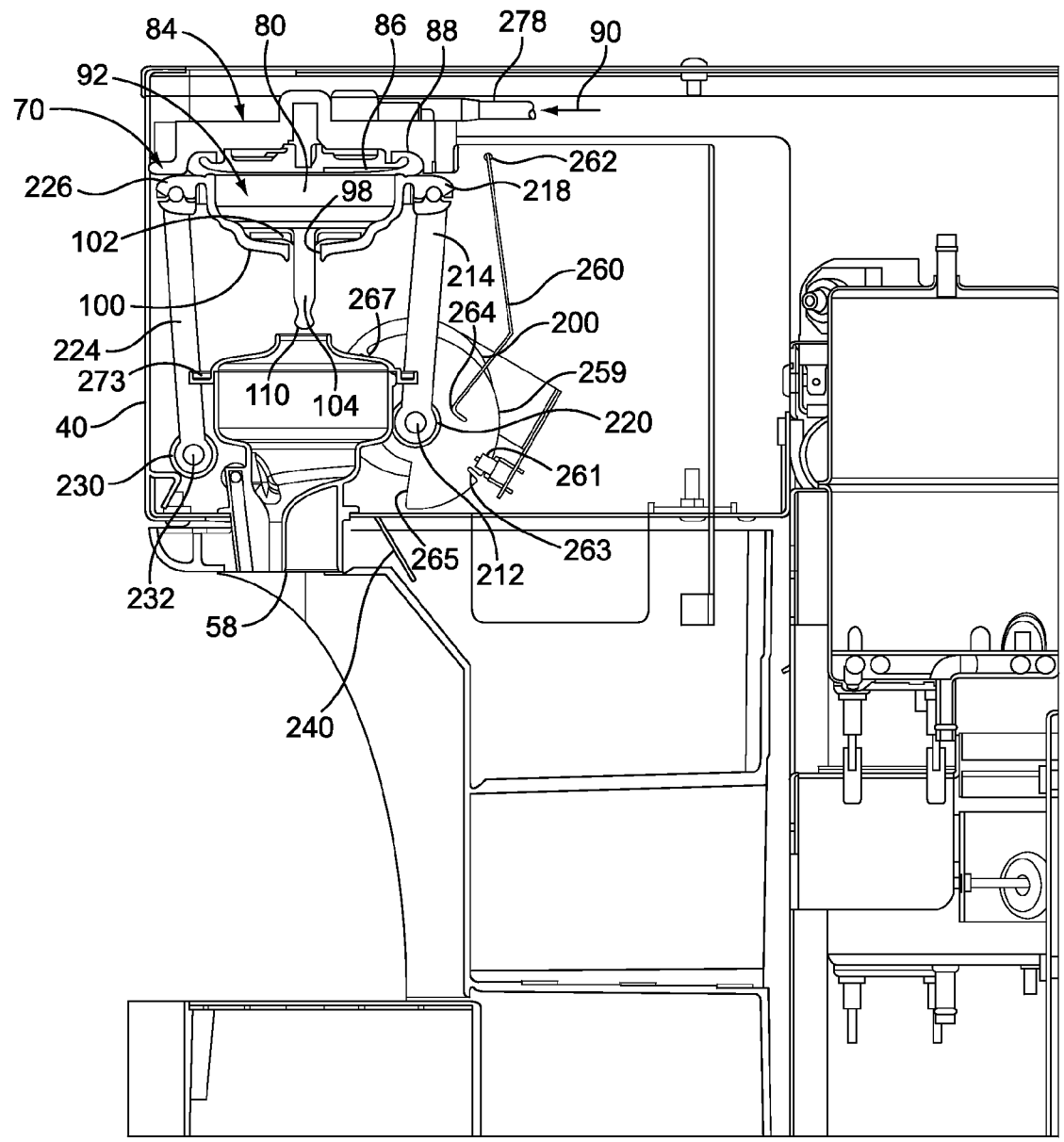
FIG. 4 is an enlarged partial fragmentary portion of the cross-sectional view shown in FIG. 3 showing an enlarged view of the pod receiver, links associated with the drive assembly, a drive motor coupled to a drive link which is coupled to the pod receiver, and a cover pivotally retained on the housing for acting against a face surface of the pod receiver during the travel of the pod receiver.

With further reference to FIG. 4, the laminating structure 104 is generally in the shape of a blade to help create a less turbulent flow exiting the drain 98. The laminator 104 extends a distance beyond the receiver 70 to help enhance the laminating or columnating effect. An enlarged foot or retaining portion 110 is provided at an end of the laminator 104 distal from the base 102 of the retainer 110 helps to retain the base in cooperation with the pod receiver 70. However, the retainer 110 is sized and dimensioned to allow it to be removed upon the application of sufficient force thereto, without the use of tools to remove and reattach the laminator 104 and attached base 102. Removal of the base allows for cleaning of the receiver 70 as well as the base 102. While it is not necessary to remove the base 102 after every use, it may be advisable to clean it from time to time to prevent the accumulation of sediments and oils.

Figure 6:
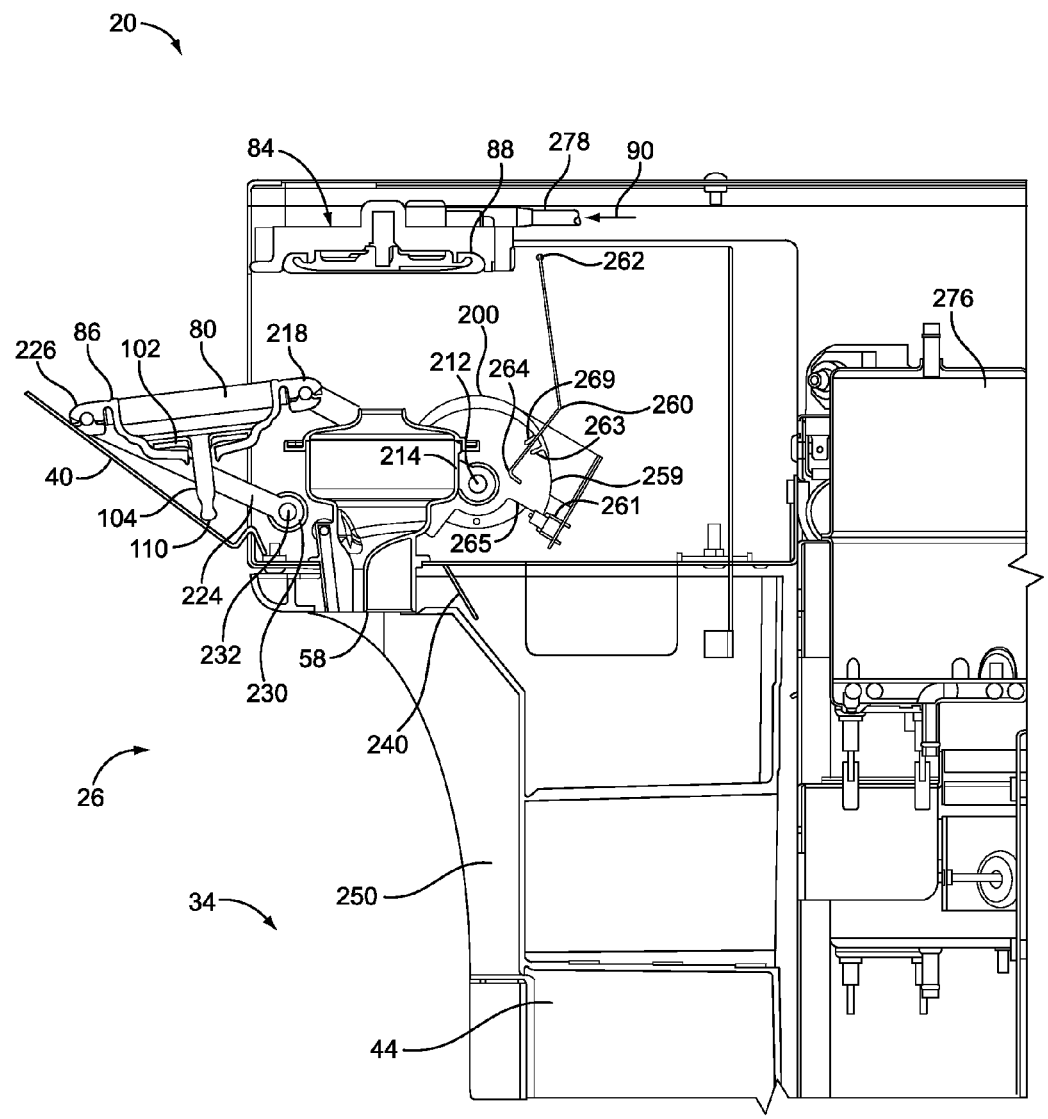
FIG. 6 is a cross-sectional view taken along the line 6-6 in FIG. 5 showing the relative position and operation of various components of the brewer.
Figure 7:
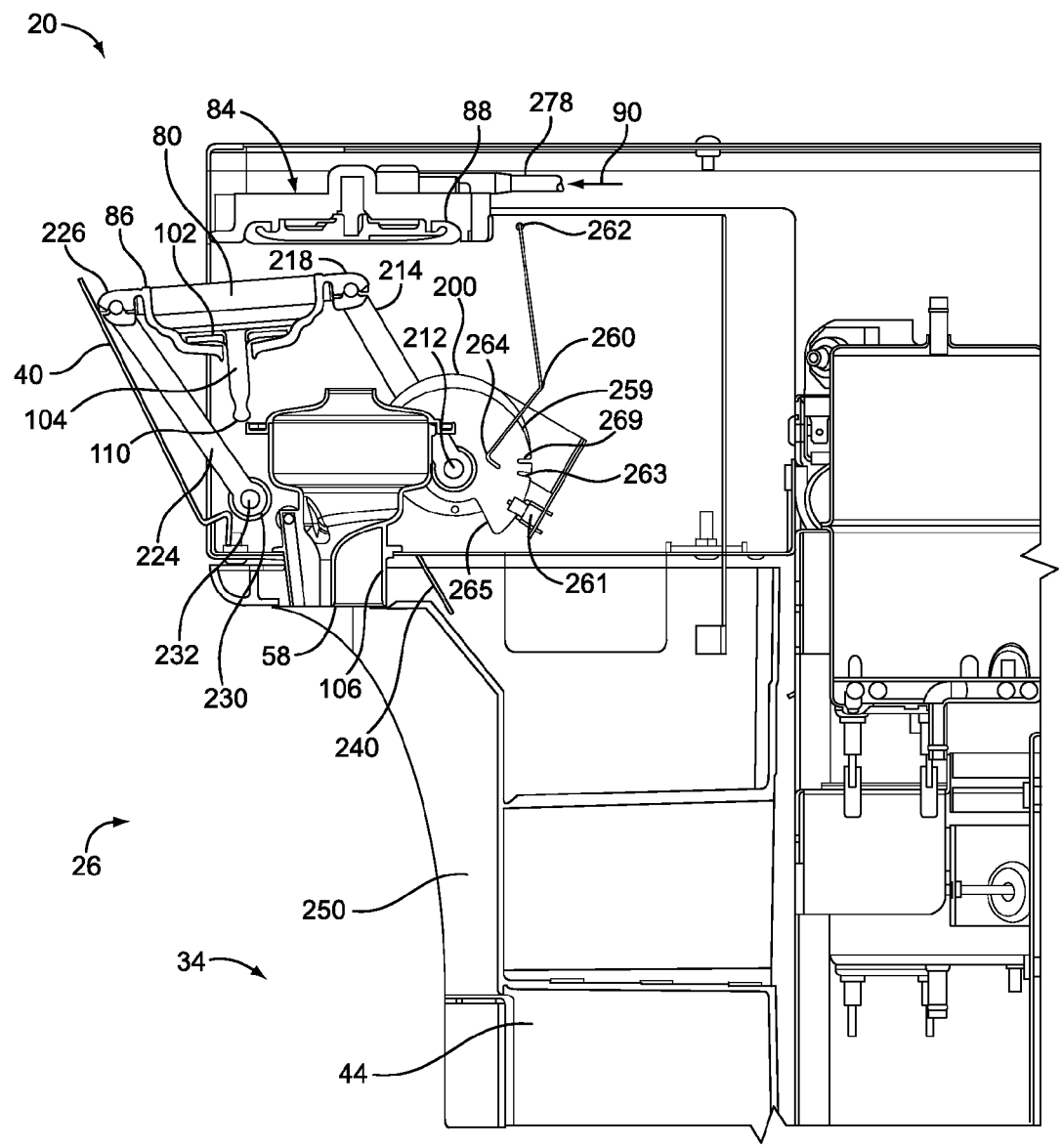
FIG. 7 is an enlarged partial fragmentary view of the pod receiver as shown in FIG. 6 along with the drive assembly and various components when the pod receiver is positioned extending from the housing of the brewer.
Figure 8:
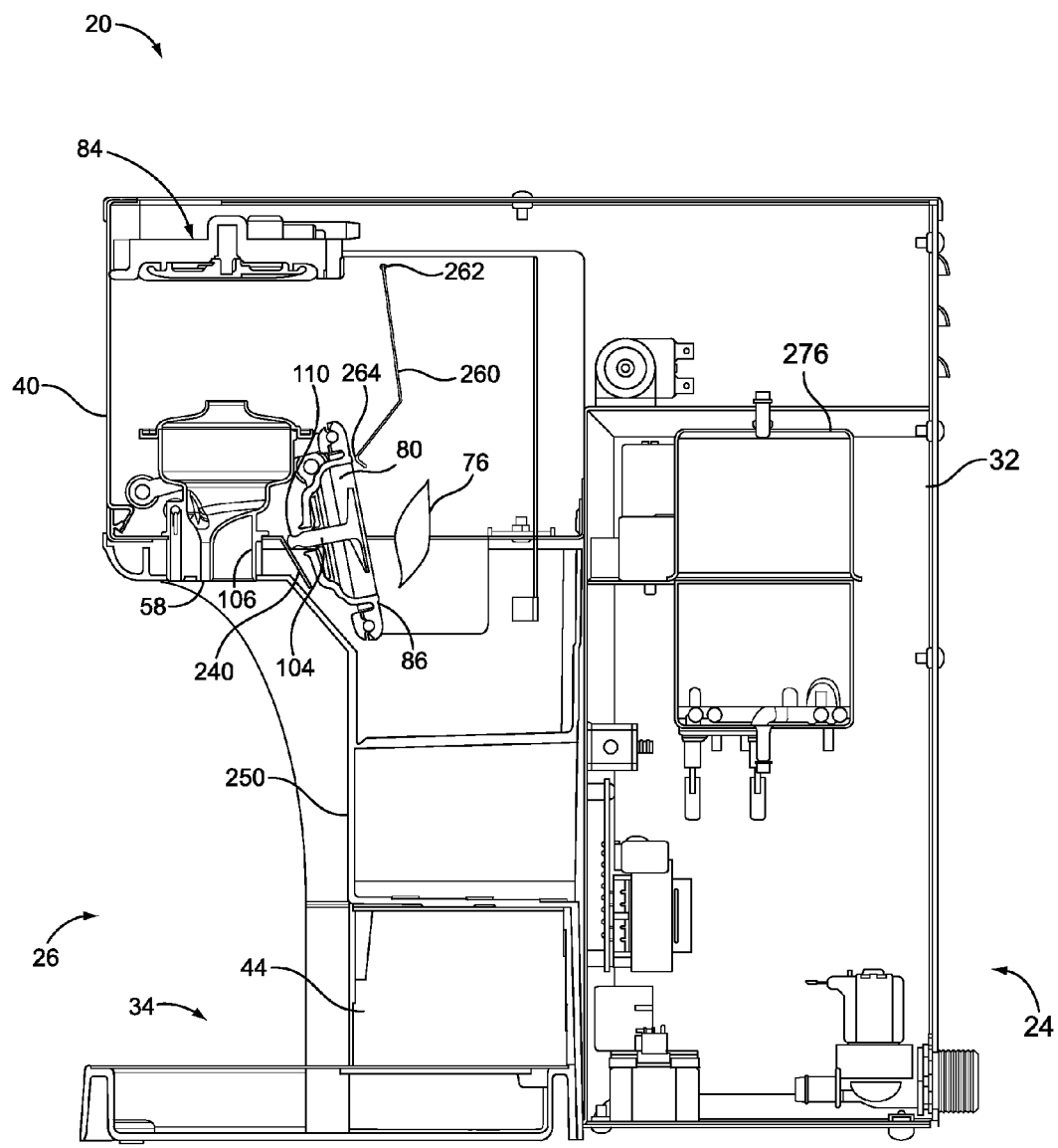
FIG. 8 is a cross-sectional view similar to that as shown in FIGS. 3 and 6 in which the pod receiver has been rotated by operation of the drive assembly to rotate yet retain the pod receiver in an orientation for dumping a pod out of the cavity in the pod receiver by operation of a lower portion or foot of a strainer stem carried on the pod receiver when the foot contacts a stop surface associated with the brewer, and the action of which causes a mechanical, unassisted shifting of the stem in the receiver.

The drive assembly 72 includes a drive motor 200 which is coupled to a controller 210. The motor 200 has a shaft 212 which is coupled to a driver link 214. An end of the drive link 214 distal from the drive shaft 212 is rotatably attached to a hinge knuckle 218 carried on the pod receiver 70. The driven end 220 of the drive link 214 attached to the shaft 212 and rotates with the shaft so that rotation of the shaft 212 translates into rotary motion of the drive link 214. Rotary motion of the drive link 214 translates into movement of the pod receiver 70 in a generally arcuate path of travel with a generally forward most position shown in FIG. 6, moving to a brewing position as shown in FIG. 3 and to a dumping position as shown in FIG. 8.

A support link 224 is similarly attached to a hinge knuckle 226 on the pod receiver 70. A pinned end 230 of the support link 224 is attached to the structure of the brewer. As such, the support link 224 rotates relative to a pivot point 232 on the brewer at the pinned end 230 in relation to movement provided by the drive motor 200. The support link 224 provides a follower motion to support the opposite end of the pod receiver 70 during the movement of the pod receiver by the drive motor 200 under control of the controller 210.

The use of a single drive motor 200 and multiple links 214, 224 coupled to the pod receiver 70 helps to reduce the number of motors associated with this system. Further, the links 214, 224 are provided in pairs such that a pair of drive links 214 are coupled to the motor 200 and a pair of supporting links 224 support the opposite end of the pod receiver 70. As a result, links attached to four generally spaced apart corners of the pod receiver 70 provide generally consistent, precise, and reliable motion of the pod receiver 70 through the various stages or phases of the brewing cycle.

The brewer includes a controller which is coupled to a sensor 261 positioned relative to a rotating disc 259. The disc 259 is keyed to the motor 200 and rotates with the motor. The disc 259 includes a series gaps, namely a large gap 265, a single gap 267, and a pair of gaps 263, 269 or double gap. The gaps correspond to various positions to be sensed by the sensor 261 to detect the various positions of the receiver or phases of a brewing cycle. The double gap 263, 269 corresponds to the brew position in which the receiver is positioned to receive water.

Figure 9:
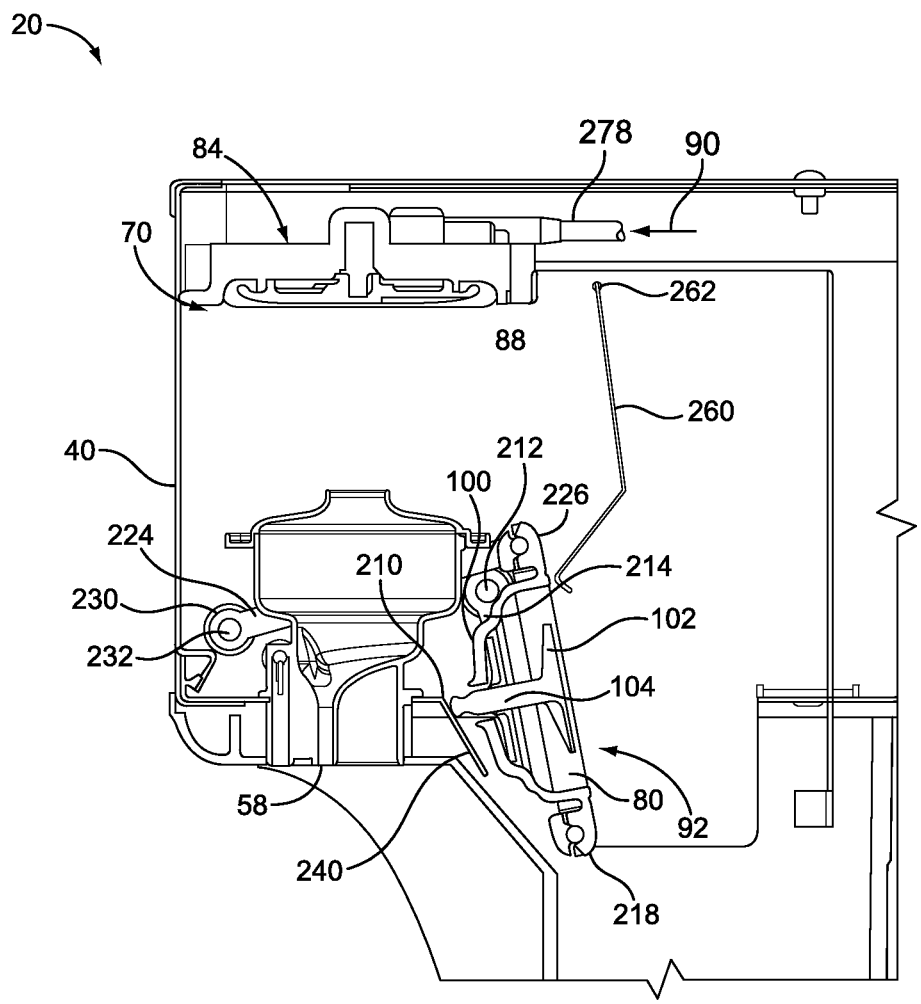
FIG. 9 is an enlarged partial fragmentary view similar to that as shown in FIGS. 4 and 7.

With further reference to FIGS. 8 and 9, the pod receiver 70 is shown in the rear most or dumping stage of travel through a brewing cycle. When the motor 200 operates the drive links 214 in a clockwise motion (relative to the illustrations provided) the rotary motion is limited by contact of the retainer 110 against a stop surface 240 of the brewer. Since the retainer 110 stops the motion of travel the motor senses the limitation on movement and reverses motion. Prior to reversing motion, the contacting of the retainer 110 against the stop surface 240 causes the laminator 104 to translate through the drain 98. This unassisted, mechanical contact causes the base 102, attached to the laminator 104 to rise through the cavity 80 towards the face 86 of the pod retainer 70. As a result, the base 102 tends to lift, disengage, or otherwise loosen the pod 76 from the cavity 80. The rotation of the pod receiver 70 and movement of the base 102 causes clearance of the pod 76 which drops into a pod collection bin 250. Multiple spent pods can accumulate in the bin 250 for subsequent removal.

As the motor rotates the drive link 214 in a counter clockwise direction, the pod receiver 70 is lifted towards the water delivery head 84. Prior to reaching the head 84 the pod receiver encounters a cover 260. The cover 260 is pivotally retained on the brewer at pivot point 262. A leading edge 264 of the cover 260 tends to move across the face 86 of the pod receiver. This motion of the cover 260 across the face 86 in combination with the movement of the base 102 interferes with a pod retained in the receiver and helps assure removal and discharge of the pod 76 from the cavity 80 to the bin. The receiver 70 returns to the brewing position (FIG. 3) ready for a command to start a new brew cycle.

The disclosed system 20 includes an assembly 300 for removal of beverage making substance 76 from the receiver 70. The assembly 300 includes at least the structures and interaction of the structures associated with the receiver 70 and the controllably coupled drive assembly 72 as well as all equivalents thereof. The assembly 300 may include the cover 260 and all equivalents thereof to aid in and further assure the removal of the pod 76 from the receiver 70.

In use, an operator approaches the brewer 20. The control panel 36, coupled to the controller 210, includes at least one control which operates the brewer to indicate to the controller 210 to advance the receiver 70 towards the front 26 of the brewer 20. Movement of the receiver 70 towards the access door 40 causes the access door to move forward thereby opening the access passage 270. The receiver 70 is positioned for receipt of a pod in the cavity 80 thereof. The user places a pod in the cavity 80. As noted above, any form of brewing container could be used with this system. The receiver 70 and the corresponding cavity 80 may be modified for various forms of container, however in each situation the receiver 70 can receive a container for infusing with water.

Once the pod is placed in the cavity the user can operate the control panel 36 to cause the drive motor 200 to drive the drive link 214 in a clockwise direction. This causes the receiver 70 to be retracted into the access opening 70. The access doors 40 is spring loaded in a closed position and as such follows the controlled movement of the receiver 70. As the receiver moves inwardly towards the head 84 the laminator 104 follows a path of travel towards the generally vertically oriented collection chamber 106. The collection chamber 106 includes a bowl portion 107 and an upper portion 109. An aperture or mouth 272 of the upper portion 109 is positioned axially aligned below the tip of the laminator 104 to collect beverage dispensed from the receiver after brewing. The chamber 106 allows beverage to collect and be directed downwardly into a container positioned there below. A sloped surface 287 is axially aligned below the mouth 272 and angled towards the aperture 58. The chamber 106 is removable and can be disassembled for cleaning. The close proximity of the tip of the laminator 104 and the aperture 272 provides a smooth transition between the tip 104 and the collection chamber 106.

With reference to FIG. 3, the receiver 70 holding the pod 76 is infused with water flowing from the water delivery system 74 includes a heated water reservoir or tank 276, a water delivery line 278 extending from the heated water reservoir extending from the heated water reservoir to the head 84. A variety of water delivery systems 74 can be configured to work with the brewer of the disclosed system. Movement of the water to and through the reservoir 276 can be by means of pressurized flow into the reservoir, pumping action in addition to flow through the reservoir, as well as a variety of other presently known or hereafter developed water delivery systems. It is envisioned that all the water delivery systems are within the scope of the present disclosure and incorporated herein.

Water flowing through water 90 flowing from the head 84 through the pod 76 drains through the base 102 and out through the drain 98. Beverage flowing through the drain 98 is directed by the laminator 104 through the passage tube 106 and into the cup 54 positioned under the outlet 58 of the tube 106.

At the conclusion of the infusion portion of the brewing cycle the motor 200 controlled by the controller 210 continues a clockwise rotation movement relative to the illustrations to move the drive link 214 towards the cover 260. Continued rotation of the drive link 214 pulls the receiver 70 towards the bin 250. Continued movement results in the retainer 110 contacting the stop surface 240, mechanically and without assistance causing the base 102 to mechanically translate within the cavity 80 of the receiver 70. Relative position of the receiver 70 in combination with the movement of the base 102 generally should reliably remove the pod 76 from the receiver 70. Nevertheless, the cover 260 is provided to move across the face 86 of the receiver 70 to help assure that any pods 76 which might accidentally and unintentionally cling to the receiver 70 are removed from the receiver and disposed in the bin 250.

Figure 10:
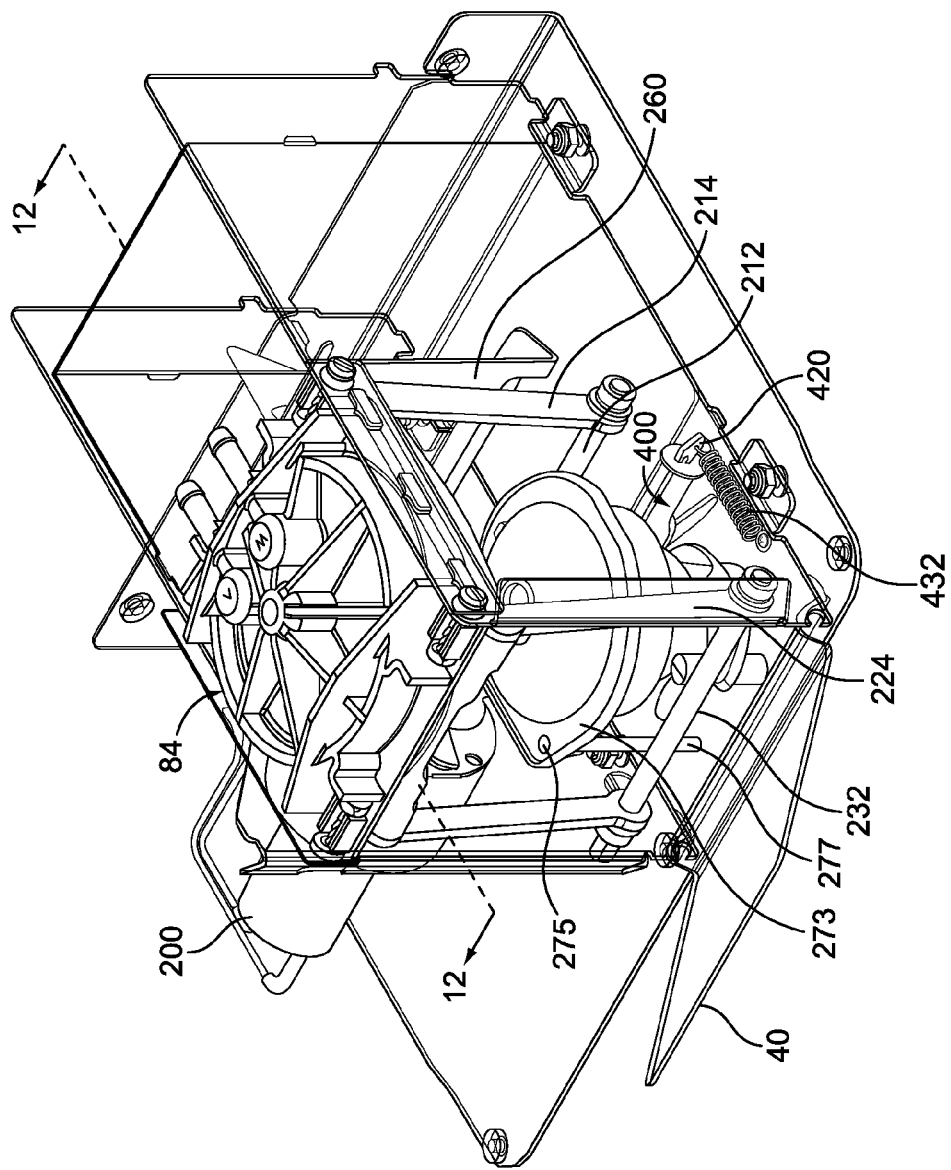
FIG. 10 is a partial fragmentary diagrammatic illustration of the receiver 70 portion of the beverage maker 20, a spring loaded flange 400 is retained in the mechanism and provides an alternate embodiment of a stop surface which is shown in FIGS. 3, 4, 6-9 for acting on a retainer displaceably carried in the receiver 70.
Figure 11:
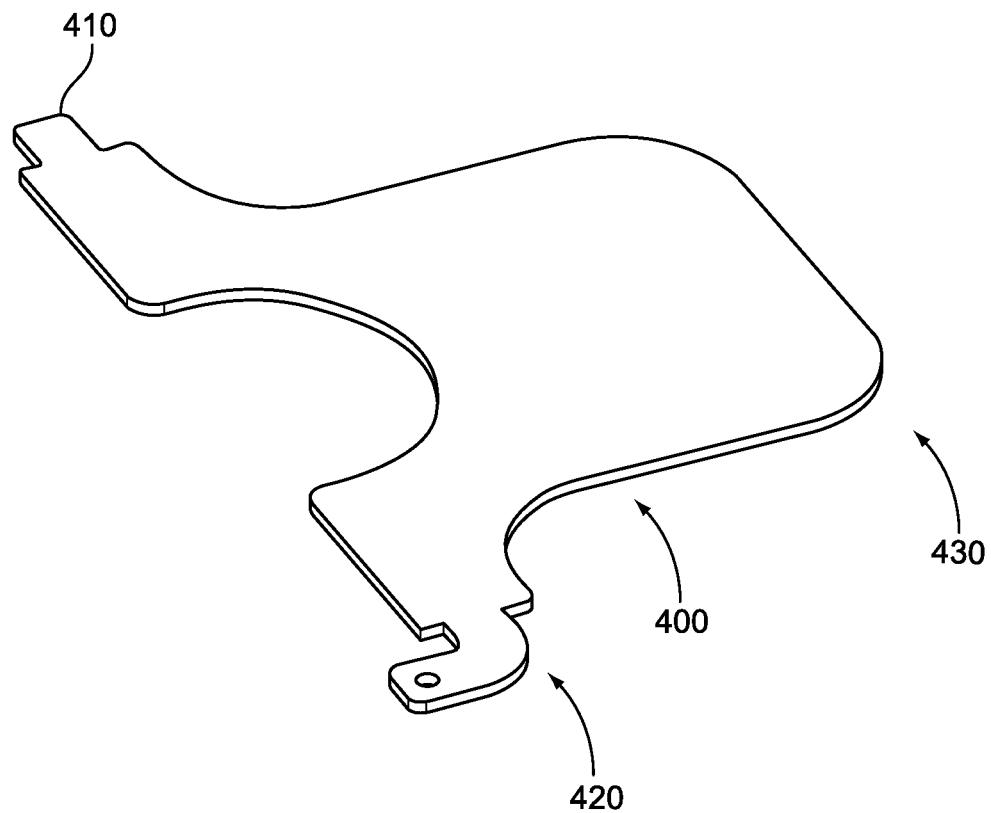
FIG. 11 is an enlarged view of the flange which includes a first end, a second end, and an enlarged contact area.
Figure 12:
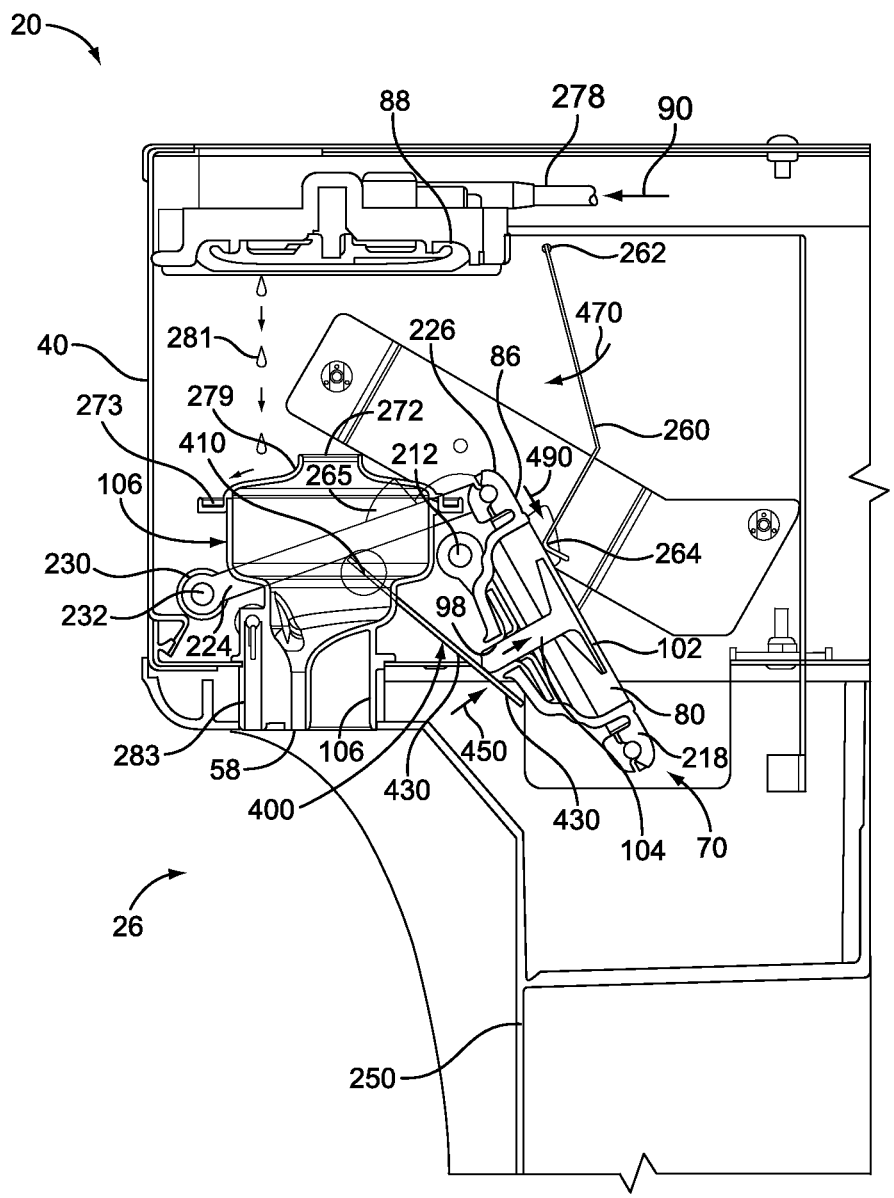
FIG. 12 is an enlarged cross-sectional view taken generally along the line 12-12 in FIG. 10 showing operation of the retainer against the flange for providing disengagement of a pod from the receiver.

FIGS. 10-12 provide an alternate embodiment of structures used for the removal of pods 76 from the cavity 80 of the receiver 70. As shown in the Figures, the alternate embodiment includes a biased flange 400 which takes the place of the stop surface 240 as shown in the prior Figures. The biased flange 400 acts against the retainer 110 to maintain a biased force 450 against the tip of the retainer 110. The combination of a pivotal force 470 on the cover 260 providing a generally scraping force 490 along the base 102 and the spring force 450 by the flange 400 help to assure that any pod 76 which has been displaced from the cavity 80 is removed therefrom. Use of these structures helps to assure that a spent pod is not presented to the user at the beginning of the next brew cycle.

In use, as the receiver is rotated towards the disposal bin, the receiver slides under the cover 260. As it moves downwardly, the tip 110 of the laminator 104 encounters the contact area 430 of the flange 400. The flange is biased or spring loaded by means of a spring 432 attached to a second end 420 to bias it normally in the upward direction providing an upward force 450. The combination of the upward force 450 and contact with the contact area 430 causes the laminator 104 to become unseated from the drain 98. The force translates into an upward movement of the laminator 104 to displace the base 102 upwardly out of the cavity 80. This causes the pod 76 retained therein to become dislodged from the cavity 80 and fall into the waste bin 250.

The flange 400 is attached to structures of the beverage maker at two locations including the first end 410 and second end 420. At least one of the ends, as noted above, is biased or spring loaded by use of a spring 432. As the receiver 70 returns to the pod receiving location at the end of a brew cycle the contact area 430 tends to maintain a biasing force 450 against the laminator 104 until the edge 264 of the cover 260 has cleared the opposing knuckle 218.

After a period of time the accumulated pods can be removed by removal of the bin 250 from the housing. The bin can then be dumped and replaced for continued use. A bin sensor can be provided to detect the level of accumulated pods in the bin. This can cause a response on a display panel 280 of the control panel 36. Such a display would cause the user to check the bin and remove the accumulated pods. Such a sensor could also be used to lock out the machine and prevent operation until the bin is emptied and then reset once emptied.

Figure 13:
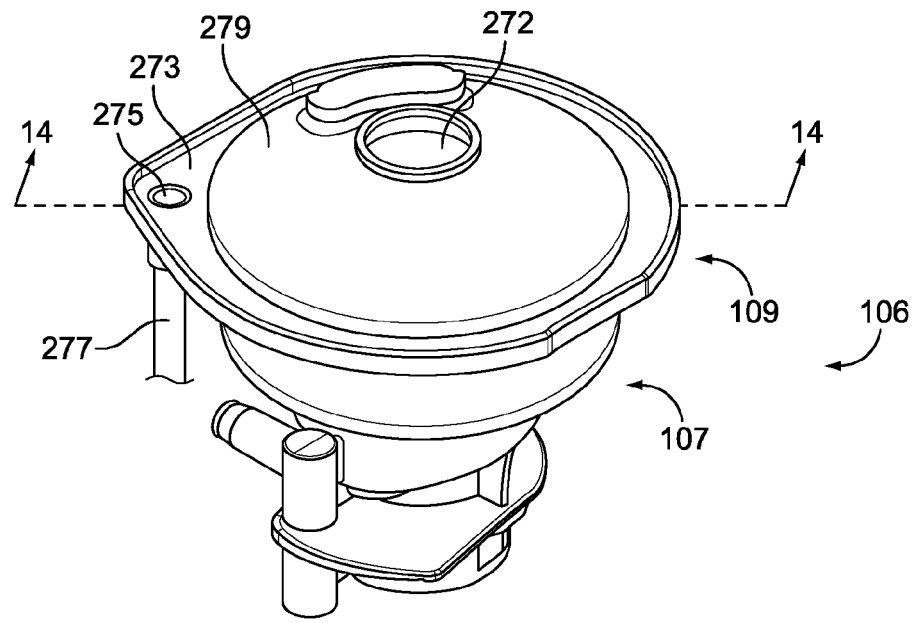
FIG. 13 is an enlarged view of a collection chamber formed by a bowl and cover which is positioned below the receiver for collecting beverage dispensed from the receiver and directing it for dispensing to a container, and including a gutter structure for collecting drips from the spray head and diverting the drip liquids to a tube which drains to the spent pod collection bin.
Figure 14:
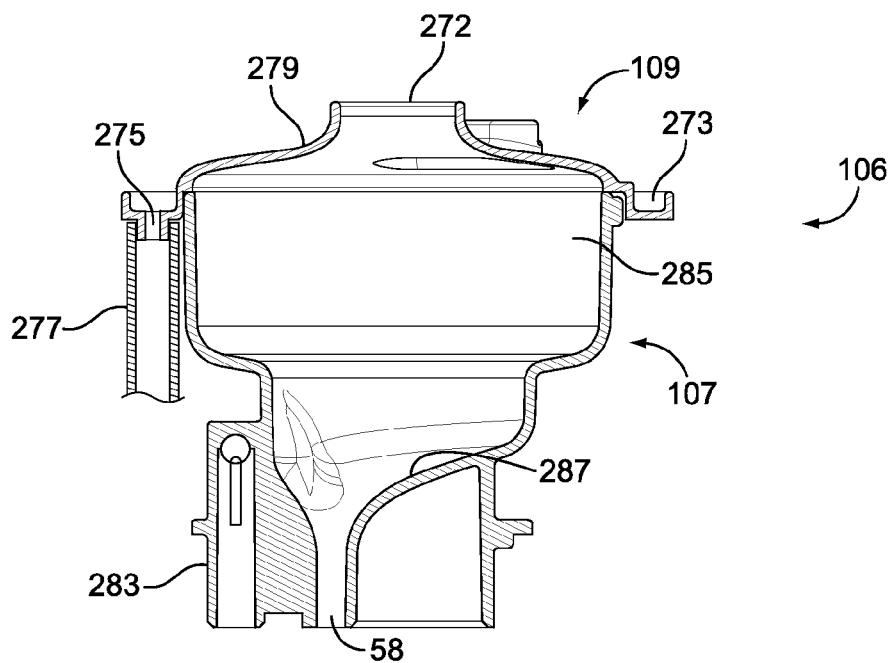
FIG. 14 is a cross-sectional view of the collection chamber taken along line 14-14 in FIG. 13 is an enlarged view of a collection chamber formed by a bowl and cover which is positioned below the receiver for collecting beverage dispensed form the receiver and directing it for dispensing to a contain.

With reference to FIGS. 12-14, the collection chamber 106 includes a drip gutter or collection rim 273 formed generally extending around the perimeter of the upper portion 109. The rim 273 drains into a drain opening 275 which is connected to a passage or tube 277. The tube 277 is directed downwardly into the bin to allow drips of water to fall onto the outside surface 279 of the upper portion cover 109 and into the rim 273. This collection of drips 281 generally falling from the spray head 84 allows the drips to be collected and prevents them from otherwise flowing into unintended areas of the machine.

The collection chamber 106 is fitted into a machine in an interference, snap fit, or maybe retained by one or more fasteners. This allows a base 283 of the chamber 106 to be fitted into the bottom portion of the machine. Similarly, the bowl portion 107 and upper portion 109 slide or otherwise fit together or are assembled and can be easily disassembled for cleaning purposes. The enlarged cavity 285 defined within the bowl 107 and upper portion allows the stream flowing from the tip of the laminator 104 to be recollected. The stream tends to disassociate after it passes through the opening 272. The enlarged cavity 285 allows a volume of beverage to accumulate in the bowl 107 collecting on the sloped surface 287 and draining through the opening 58.

The invention claimed is:

1. A beverage maker for use in combining a beverage making substance retained in a beverage making container with water to produce and dispense a beverage; the beverage maker comprising:
    a housing;
    a controller retained in the housing;
    a drive assembly coupled to the controller;
    a user interface carried on the housing and coupled to the controller;
    a controllably movable receiver defining a cavity for receiving and retaining a beverage making container, the drive assembly coupled to the receiver for controllably moving the receiver into and out of the beverage maker housing for receiving a beverage making container and positioning the container for brewing;
    a controllable water delivery system coupled to the controller and controllably dispensing water to the container positioned in the receiver to produce a beverage therefrom;
    a spray head of the controllable water delivery system being retained in a fixed position in the housing for engagement with the controllably movable receiver by movement of the receiver relative thereto and delivering water to the receiver;
    a foraminous base and laminator positioned in the cavity and slidably displaceable relative to a drain aperture in the receiver for use in dislodging a spent container from the receiver, a beverage making container being positionable over the foraminous base in the cavity to facilitate passage of beverage produced from the container through the foraminous base;
    a collection chamber positioned in the housing below the drain aperture in the receiver for receiving beverage and dispensing it to a container;
    a structure positioned in the housing against which the laminator is mechanically driven while the drive assembly is moving the receiver in which the laminator is carried producing axial translation of the laminator and base thereon along the drain aperture in the receiver; and
    a collection bin positioned in the housing for receiving spent containers dislodged from the receiver.

2. The beverage maker of claim 1, further comprising a cover movably retained in the housing in the path of travel of the receiver in the housing and positioned proximate the bin for cooperatively moving along the receiver and interfering with a container retained relative to the receiver after a discharge portion of the brewing cycle to help discharge the spent container to the bin.

3. The beverage maker of claim 1, further comprising the base and extending laminator being replaceably removable from the receiver without the use of tools.

4. The beverage maker of claim 1, the collection chamber further comprising a bowl and a cover defining a cavity, the chamber positioned proximate to and spaced apart from a tip of the laminator when the receiver is in a brewing portion of the brewing cycle, a mouth on the cover of the chamber positioned for receiving beverage flowing from the receiver along the laminator.

5. The beverage maker of claim 4, wherein the chamber is removably retained in the housing with the cover being removable from the bowl.

6. The beverage maker of claim 4, further comprising a sloped floor in the bowl of the collection chamber positioned generally axially below the mouth of the collection chamber, the sloped floor being angled toward an outlet of the collection chamber.

7. The beverage maker of claim 4, further comprising a rim positioned around at least a portion of the collection chamber for collecting liquid dripped on the cover.

8. The beverage maker of claim 7, further comprising a drain opening communicating with the rim for directing collected liquid away from the chamber.

9. The beverage maker of claim 4, further comprising a passage coupled to the drain opening for directing the collected liquids to the bin.

10. The beverage maker of claim 1, further comprising the receiver being coupled to the drive assembly for moving the receiver through a path of travel relative to the fixed position spray head during a brew cycle, the drive assembly including a drive motor coupled to the controller, at least one link operatively connected to the receiver and to the drive motor for translating motion from the drive motor to move the receiver.

11. The beverage maker of claim 10, further comprising four rotatable links operatively connected to the receiver at four spaced apart locations, one of the four links being coupled to the drive motor for controllably moving the receiver.

12. The beverage maker of claim 1, further comprising an expandable gasket positioned around the spray head for sealing engagement during a brew cycle and disengagement when not engaging the spray head during a brew cycle.

13. The beverage maker of claim 1, further comprising a cup riser displaceable retained in the housing, the riser being extendable from the housing for providing an elevating structure for a cup relative to receive beverage from the beverage maker.

14. A beverage maker for use in combining a beverage making substance retained in a beverage making container with water to produce and dispense a beverage; the beverage maker comprising:
   a housing;
   a controller retained in the housing;
   a drive assembly coupled to the controller;
   a controllable water delivery system coupled to the controller for controllably dispensing water to the container to produce a beverage therefrom;
   a controllably displaceable receiver assembly including a plurality of rotatable links and operatively coupled to the controller, a portion of the receiver assembly defining a cavity for retaining a beverage making container, the drive assembly coupled to the receiver for controllably moving the receiver the container into the beverage maker housing during a brewing cycle;
   a spray head of the controllable water delivery system being retained in a fixed position in the housing for engagement with the controllably movable receiver by movement of the receiver relative thereto and delivering water to the receiver;
   a foraminous base displaceably retained in the cavity for use in dislodging a spent container from the cavity;
   a laminator extending from the foraminous base through a drain aperture of the receiver being axially movable through the drain aperture; and
   a structure positioned in the housing against which the laminator of the foraminous base is mechanically driven while the drive assembly is moving the receiver in which the laminator is carried producing axial translation of the laminator and base thereon along the drain aperture in the receiver to dislodge a spent container from the receiver.

15. The beverage maker of claim 14, further comprising a cover movably retained in the housing in the path of travel of the receiver in the housing for cooperatively moving along the receiver and interfering with a container retained relative to the receiver after a discharge portion of the brewing cycle to help discharge the spent container.

16. The beverage maker of claim 14, further comprising a collection chamber further comprising a bowl and a cover defining a cavity, the chamber positioned proximate to and spaced apart from a tip of the laminator when the receiver is in a brewing portion of the brewing cycle, a mouth on the cover of the chamber positioned for receiving beverage flowing from the receiver along the laminator.

17. The beverage maker of claim 14, further comprising the receiver being coupled to a-drive the drive assembly for moving the receiver through a path of travel relative to the fixed position spray head during a brew cycle, the drive assembly including a drive motor coupled to the controller, at least one link operatively connected to the receiver and to the drive motor for translating motion from the drive motor to move the receiver.

* * * * *